United States Patent [19]

Tomaschek et al.

[11] Patent Number: 4,966,936
[45] Date of Patent: Oct. 30, 1990

[54] PLASTISOL COMPOSITION

[75] Inventors: Heinz A. Tomaschek, Mainz; Helmuth Perlik, Wallhausen, both of Fed. Rep. of Germany

[73] Assignee: Dinol International Aktiebolag, Hassleholm, Sweden

[21] Appl. No.: 266,845

[22] Filed: Nov. 3, 1988

[30] Foreign Application Priority Data

Nov. 4, 1987 [SE] Sweden ................................. 8704307

[51] Int. Cl.$^5$ .............................................. C08K 3/76
[52] U.S. Cl. .................................... 524/425; 524/567; 524/569; 524/527
[58] Field of Search ............... 524/425, 567, 569, 527; 525/239, 240

[56] References Cited

U.S. PATENT DOCUMENTS 2,713,563  7/1955  Kuhn ................................... 524/425
3,755,238  8/1973  Wiita ................................... 526/180

FOREIGN PATENT DOCUMENTS 985327  7/1951  France .

OTHER PUBLICATIONS

Chemical Abstracts, vol. 81, 106773s, Nov. 4, 1974.

*Primary Examiner*—Joseph L. Schofer
*Assistant Examiner*—Jeffrey T. Smith
*Attorney, Agent, or Firm*—Burns, Doane, Swecker & Mathis

[57] ABSTRACT

The present invention relates to a plastisol composition based upon polyvinyl chloride and comprising polyvinyl chloride, plasticizers, and calcium carbonate, as main components, whereby the composition furthermore comprises a polyolefin oligomer having 2 to 4 carbon atoms in the monomer basic part, in an amount of 0.1 to 25% by weight of the total composition.

8 Claims, 3 Drawing Sheets

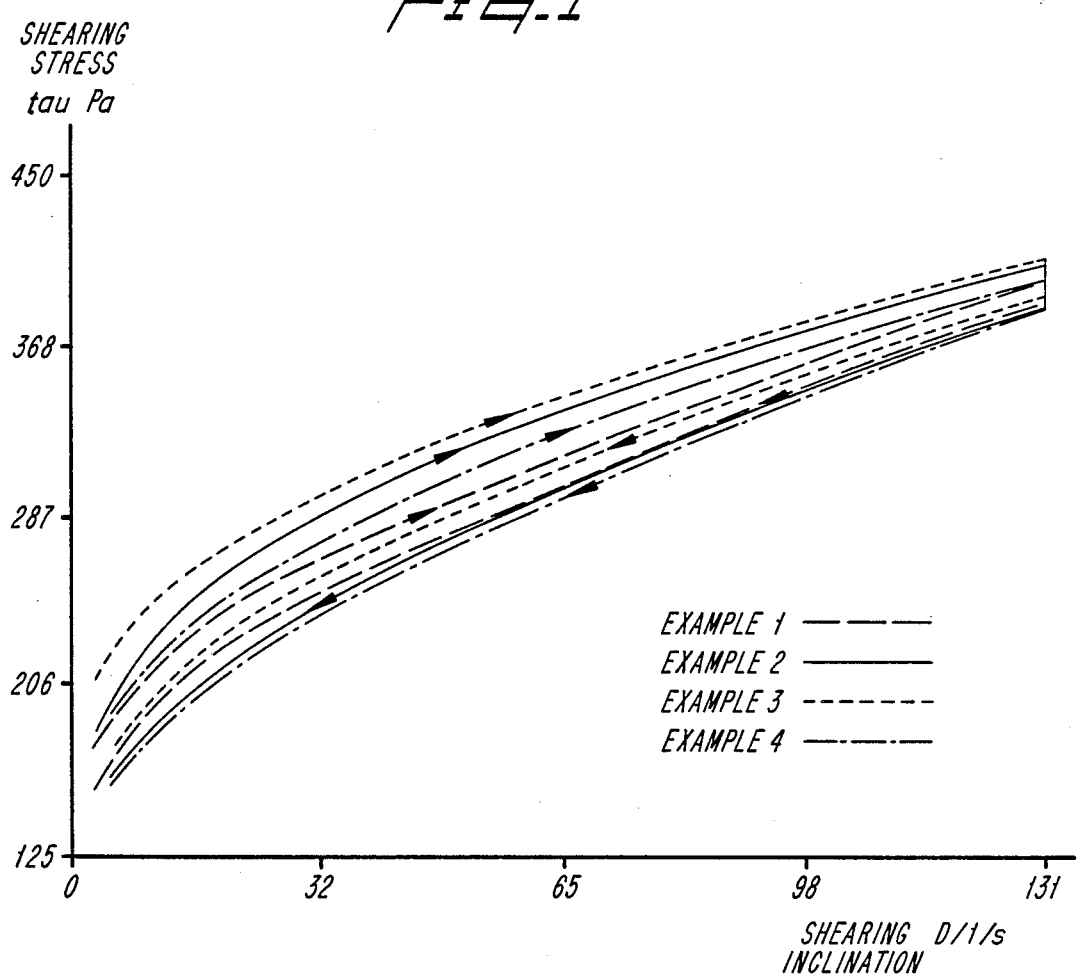

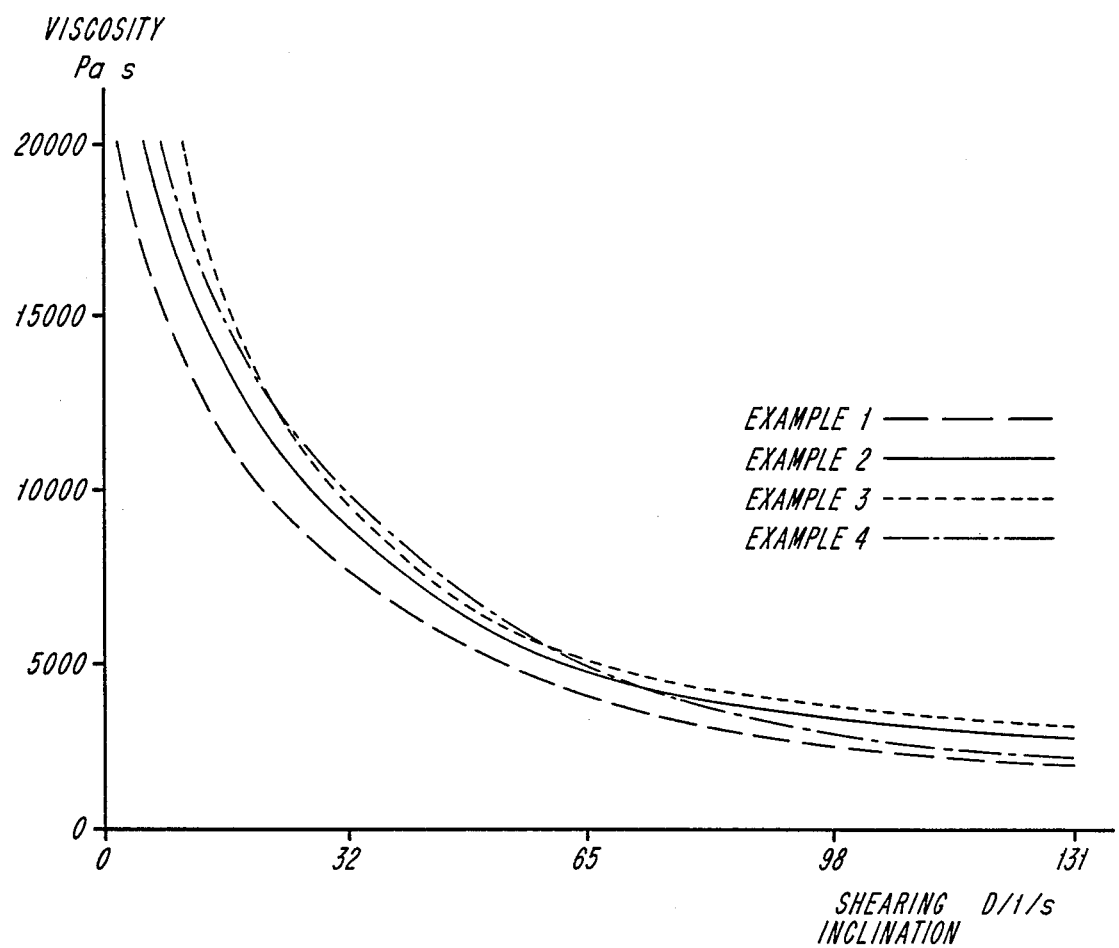

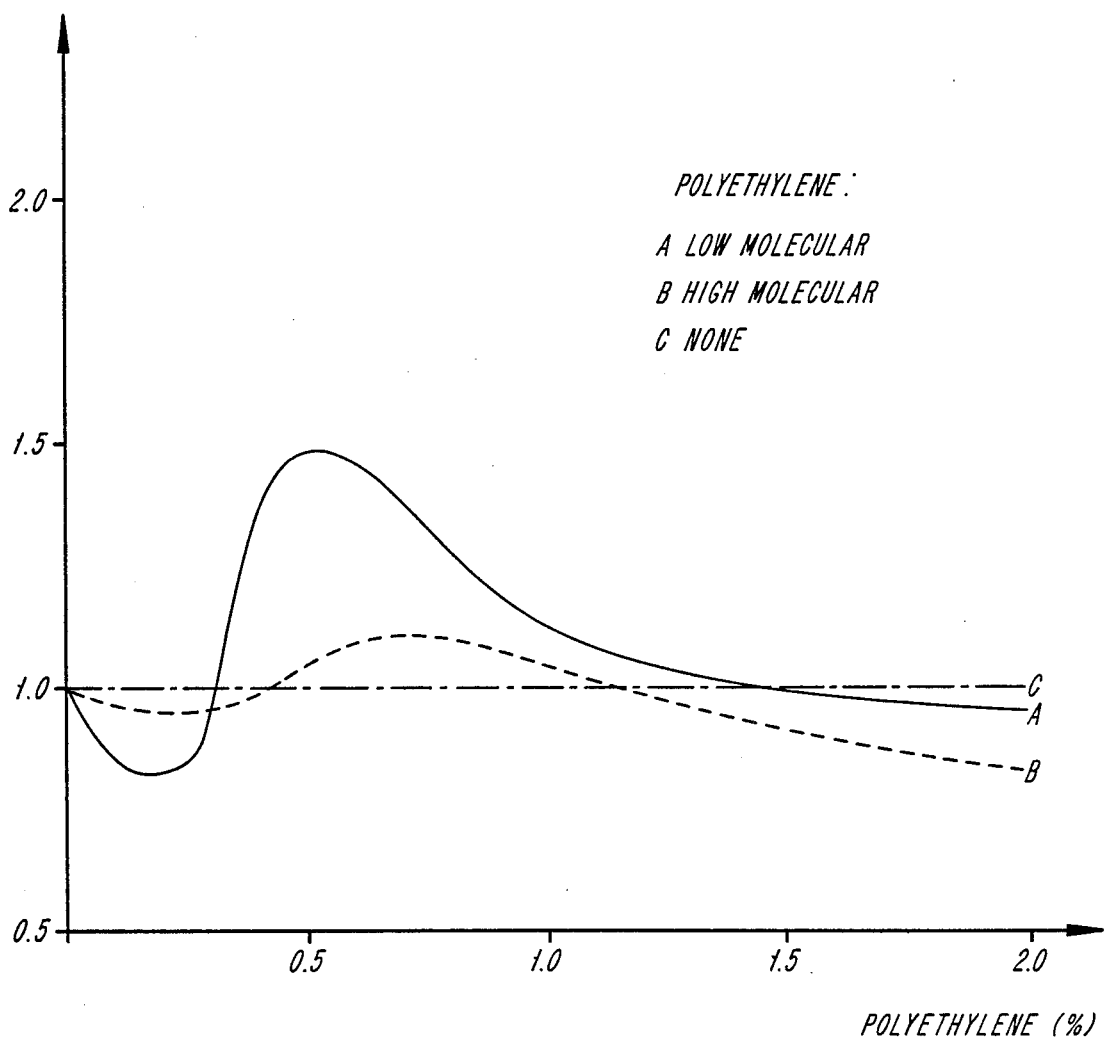

PLASTISOL COMPOSITION

DESCRIPTION

1. Technical Field

The present invention relates to a plastisol composition having improved thixotropic features and improved stretchability.

The object of the present invention is to obtain a polyvinyl based (PVC) plastisol having improved thixotropic features and improved stretchability.

Further objects will be evident from the following.

2. Background of the Invention

PVC-plastisols consist of a mixture of pulverulent PVC, calcium carbonate, plasticizers and other additives, which in an unhardened state are to be regarded as emulsions of PVC and other components in the plasticizer. During hardening, which takes place at an elevated temperature, an irreversible change follows whereby it forms an emulsion of plasticizer in PVC, whereby the matrix formed embeds all other components.

The properties of a PVC-plastisol are not only dependent on the type of PVC, but also on the properties of the other ingredients used. It is hereby important that one knows the impact of PVC-type as well as of the additives, such as plasticizers, stabilizers, fillers, pigments and others on the plastisol in order to be able to produce a paste for a predetermined area of use.

Within the scope of the ambitions of the automobile industry to save fuel and generally reduce costs, such as to reduce the amount of underbody protective coating mass in the form of PVC plastisol, demands have been brought forward for a lower density and a greater resistance to abrasion. The former gives a direct lowering of the weight, the latter allows a considerable reduction of the amount of plastisol being applied for equal mechanical properties.

The mean densities of the main components present in a PVC-plastisol are

Calcium carbonate: 2.65
PVC: 1.40
Plasticisers: 1.00

Thereby a drastic reduction of the content of calcium carbonate with a simultaneous increase of the contents of the PVC seems to be unavoidable, as an increase of the part of plasticizers is impossible due to the appearing exudation of this latter material.

However, the content of calcium carbonate is already today heavily reduced, and is normally about 15% by weight and can hardly be further reduced without considerably deteriorating the rheological properties.

Trials to reduce the density of the final plastisol to about 1.2 have been made by using other fillers. Thus microspheres of glass, or hollow bodies of silicate have been tested, but due to considerably increased wearing out of the spraying equipment used, this has turned out not to be way feasible way.

It has been proposed, JP-A-78140334, to add a powder of a polyolefin to a paint based upon polyvinyl chloride and containing solvents (ketones and cellosolve) to a 20% dry matter contents. The paint is dried at 205° C. during loss of the solvents. Such paints are not and can not be used as a PVC-plastisol, which is essentially solvent-free.

DESCRIPTION OF THE PRESENT INVENTION

It has now surprisingly been shown possible to be able to solve this problem of replacing heavy components in PVC-based plastisol in accordance with the present invention, which is characterized in that the composition furthermore comprises a polyolefin prepared from an olefin monomer having 2 to 4 carbon atoms thereof.

According to a preferred embodiment of the invention, the polyolefin, which is basically an oligomer, consists of pulverulent low molecular weight polyethylene.

By means of the present invention, it has not only been shown possible to lower the density, but this addition of polymer has a mainly positive influence on the PVC plastisol thus produced. Thus the amount of filler can be varied to a greater extent.

It has also turned out that the thixotropy of the plastisol can be considerably improved using a polyolefin, such as polyethylene, having a particle size of the particle size distribution given. The modified plastisols obtained thus show a considerably improved brushability which meets the demands of the automobile industry. The commonly appearing thin strikes fail to turn up completely. The common lining of this phenomena using suitable pigments is thus not necessary due to the presence of a necessary amount of material.

The invention thus relates to compositions based upon PVC plastisols according to the prior art which plastisols comprises plasticizers of different types, calcium carbonate of different types (ground, precipitated, coated, uncoated) and PVC powder having different particles sizes, as main components, as well as different additives and stabilizers, the kind and amount of which is determined by the exact area of use.

The invention will be described more in detail in the following with reference to some Examples which relate to PVC plastisols intended to be used for the protection of car under bodies, however, without being restricted thereto.

The organic fillers according to the present invention relates to a group of polyolefins with accompanying monomers of the general formula $$CH_2=CHR$$

wherein

| Compound | R |
|---|---|
| I ethylene | —H |
| II propylene | —$CH_3$ |
| III isobutylene | —$(CH_3)_2$ |
| IV butadiene-1,3 | —CH=$CH_2$ |

The polymers obtained from these monomers are present in molecular weights from some thousands to 8 millions, whereby those used herein are polyolefin oligomers (waxes) and have a molecular weight of from about 4,000 to about 50,000, preferably 4,000 to 25,000. All these are suitable as fillers according to the present invention. Due to its inert properties vis-a-vis the plasticizer, polyethylene (I) and polypropylene (II) are particularly preferred, which, however, does not exclude the use of polyisobutylene (III) and polybutadiene-1,3 (IV). The amount of polyethylene used is about 0.1 to 25% by weight, preferably 0.3 to 10% by weight, and more preferably 0.5 to 2% by weight. Other polyolefins are used in amounts relative hereto.

The particle size and the particle size distribution have a considerable importance to the properties of a plastisol, whereby the particle size distribution used in the present invention is between 0.5 to 100 μm, preferably 2 to 50 μm, more preferably 5 to 20 μm.

At the preparation of the present pasty emulsions, the organic filler is added preferably simultaneously with the PVC powder. Thereby it is achieved that the material becomes completely dispersed in and absorbed by the composition.

The rheological properties will thereby be fully developed.

EXAMPLE 1 (basic)

In a rapidly rotating mixer having a peripheral speed of 25 m/s, the liquid components given below were first added, and then the solid components were stirred into it. After having reached a homogeneous paste the stirring was continued under vacuo to eliminate air incorporated therein. The basic plastisol thus prepared was used in the tests.

| Component | % |
| --- | --- |
| Phthalate plasticizer | 40 |
| Secondary plasticizer | 2 |
| Polyamino amide | 1.5 |
| PVC | 40 |
| Calcium carbonate | 15 |
| Stabilizers | 1.5 |

Rheological data obtained in a Physica Rotation Viscosimeter according to DIN 53019 are evident from FIG. 1 (shearing stress) and from FIG. 2 (viscosity course).

EXAMPLES 2 to 4

In the same way as in Ex. 1 above, plastisols were prepared in accordance with the below table and comprising polyethylene, whereby the amount of PVC was replaced by polyethylene. The density of the polyethylene is typically 0.93.

| Compound | Example | | | |
| --- | --- | --- | --- | --- |
|  | 1 | 2 | 3 | 4 |
| PVC (%) | 40 | 38.5 | 33 | 33 |
| Polyethylene (%) | — | 1.5 | 7 | 7 |
| (Polyethylene per 1000 parts) | — | (15) | (70) | (70) |

The polyethylene used in Examples 2 to 3 had a molecular weight of 12,000 and a mean particle size of 5 μm, while the polyethylene used in Example 4 had a molecular weight of 5,000,000 (outside the scope of this invention, and used as a comparative example herein) and a mean particle size of 40 μm.

The rheological properties compared with the same properties of the basic plastisol according to the prior art are evident from FIG. 1 and FIG. 2.

The difference between the up-going curves and the down-going curves (FIG. 1) is a direct measure of the thixotropy and in combination with the yield point they are directly responsible for the stability of the plastisol.

A comparison of the curves shows clearly that the stability has increased by influence of the additives.

The thixotropy corresponds to the area between the up-going and the down-going curves in FIG. 1 and can be calculated to the following for the Examples given:

|  | Thixotropy area (Pa/s/cm$^3$) |
| --- | --- |
| Example 1 | 166 |
| Example 2 | 312 |
| Example 3 | 360 |
| Example 4 | 280 |

As evident from the data given the thixotropy area is considerably reduced between the plastisol of Ex. 3 and Ex. 4.

In an abrasive test the plastisols according to the invention showed a 50% increase in abrasive resistance.

EXAMPLE 5

Plastisol compositions according to Ex. 1 and Ex. 2 were simultaneously applied in a simulated serial underbody protective treatment by means of airless spraying on a smooth, non-absorbing body using a varying thickness of the layer between 0.5 and 1.0 cm, using one or more uncoated zones. Using an angled brush the thickly applied plastisol was brushed onto the uncoated zones, in order to obtain an equal coating to such a great extent as possible, and in order to obtain a simulation of the improvements made on a moving band using a brush. Hereby it turned out that the reference material of Ex. 1 was relatively easy to brush out, as it generally is, whereby, however, a very great thinning of the material occurred. In order to optically line this thinning a colouring pigment was added which, however, did not weaken the resulting layer of plastisol when hardened.

The plastisol according to Ex. 2 showed on the contrary during the same brushing conditions a very equal distribution of material. One skilled in the art immediately could feel the "butter-like gliding" of the brush on the plastisol and equally the distribution of the material on the uncoated zones. A measurement afterwards of the thickness of the layers after hardening, showed that the thinning of the material, such as when using a plastisol of Ex. 1, did not occur. In all cases a sufficiently thick protective layer was obtained.

Determination of the thickness using an electronic Mitutoyo layer thickness meter gave the following values at comparable starting values.

|  | Brushing thickness |
| --- | --- |
| Ex. 1 | 50 to 300 /μm |
| Ex. 2 | 300 to 600 /μm |

The resistance to abrasion mentioned above was tested and surprisingly very pronounced when using a low molecular weight pulverulent polyethylene (polyethylene oligomer) and when added in amounts from about 0.5% by weight. The determination of the resistance to abrasion was made on coated steel plates. The PVC-plastisol was applied in layer of the thickness of 600 μm and was dried for 1 hr at 150° C. in a warm air oven. The determination of the resistance to abrasion was compared with a plastisol containing no low molecular weight polyolefin, and with a plastisol containing a high molecular weight polyolefin. A standarized spraying liquid hereby fell from a given height down onto an inclined steel plate coated with the plastisol. The amount of liquid to cut through the coating was determined, and the resistance to abrasion can be expressed as ml of liquid/μm of coating layer. In FIG. 3 attached the resistance to abrasion is given vis-a-vis the increased concentration of polyolefin.

(A) is a low molecular weight polyethylene of the invention;
(B) is a high molecular weight polyethylene ($M_w=5,000,000$);
(C) is a PVC-plastisol without polyethylene (Ex. 1).

The resistance to abrasion of (C) was given as 1, and the other data are expressed relative hereto.

A PVC plastisol composition can thus be varied within the scope of the present invention with reference to its content in accordance with the following general compositions:

| PVC | 15-40 | % by weight |
| Polyolefin | 0.1-25 | % by weight |
| Calcium carbonate | 13.5-20 | % by weight |
| Plasticisers and other Components | 40-46.5 | % by weight |
| or more preferably | | |
| PVC | 30-40 | % by weight |
| Polyolefin | 0.5-10 | % by weight |
| Calcium carbonate | 13.5-18 | % by weight |
| Plasticisers and other Components | 42-46.5 | % by weight |

What is claimed is:

1. A plastisol composition comprising a mixture of:
   (a) polyvinyl chloride;
   (b) plasticizer;
   (c) calcium carbonate; and
   (d) organic filler which is at least one polyolefin oligomer of an olefin monomer having 2 to 4 carbon atoms in an amount of from 0.1 to 25% by weight of the composition; wherein the polyolefin oligomer has a particle size distribution of from 5 to 20 microns; and wherein the polyolefin oligomer has a molecular weight of from 4,000 to 25,000.

2. The plastisol composition of claim 1 wherein the polyolefin oligomer has a particle size distribution of from 2 to 50 microns.

3. The plastisol composition of claim 1 wherein the polyolefin oligomer has a particle size distribution of from 5 to 20 microns.

4. The plastisol composition of claim 1 wherein the polyolefin oligomer is present in an amount of from 0.5 to 10% by weight of the composition.

5. The plastisol composition of claim 1 wherein the polyolefin oligomer is prepared from a monomer having the general formula:

$CH_2=CHR$ wherein R is $-H$, $-CH_3$, $-(CH_3)_2$, $-CH=CH_2$, or mixtures thereof.

6. The plastisol composition of claim 1 wherein the amount of polyvinyl chloride is from 15 to 40%, the amount of calcium carbonate is from 13.5 to 20%, and the amount of plasticizer and any other components is from 40 to 46.5%, all percentages being by weight of the plastisol composition.

7. The plastisol composition of claim 4 wherein the amount of polyvinyl chloride is from 30 to 40%, the amount of calcium carbonate is from 13.5 to 18%, and the amount of plasticizer and any other components is from 42 to 46.5%, all percentages being by weight of the plastisol composition.

8. The plastisol composition of claim 1 wherein the polyolefin oligomer is low molecular weight polyethylene in pulverulent form.

* * * * *